(12) United States Patent
Beaver et al.

(10) Patent No.: US 9,429,312 B2
(45) Date of Patent: Aug. 30, 2016

(54) COMPONENT FOR ELECTRIC POWER SYSTEM AND METHOD OF DETERMINING WHETHER A POWER CIRCUIT IN AN ELECTRIC POWER SYSTEM IS OPEN OR CLOSED

(71) Applicant: EATON CORPORATION, Cleveland, OH (US)

(72) Inventors: Jon Christopher Beaver, Greenwood, SC (US); Michael Howard Abrahamsen, Greenwood, SC (US); Donald R. Fenner, Greenwood, SC (US)

(73) Assignee: EATON CORPORATION, Cleveland, OH (US)

( * ) Notice: Subject to any disclaimer, the term of this patent is extended or adjusted under 35 U.S.C. 154(b) by 320 days.

(21) Appl. No.: 14/043,312

(22) Filed: Oct. 1, 2013

(65) Prior Publication Data
US 2015/0092388 A1  Apr. 2, 2015

(51) Int. Cl.
*F21V 33/00* (2006.01)
*H01H 9/16* (2006.01)
*F21V 8/00* (2006.01)
*H01H 1/42* (2006.01)

(52) U.S. Cl.
CPC .......... *F21V 33/0076* (2013.01); *H01H 9/161* (2013.01); *G02B 6/0005* (2013.01); *G02B 6/0006* (2013.01); *G02B 6/0008* (2013.01); *H01H 1/42* (2013.01)

(58) Field of Classification Search
CPC ....... F21V 33/0076; G02B 6/00; G02B 6/35; H01H 2219/062
USPC ................. 200/308, 43.02–43.22, 296, 310, 200/312–313, 317; 362/23.04
See application file for complete search history.

(56) References Cited

U.S. PATENT DOCUMENTS

| 5,117,208 A | * | 5/1992 | Nar | ..................... H01H 71/1027 335/172 |
| 2009/0140871 A1 | * | 6/2009 | Titus | ........................ H02H 3/04 340/638 |
| 2011/0170824 A1 | * | 7/2011 | Cox | ..................... G01F 23/2921 385/16 |

* cited by examiner

*Primary Examiner* — Edwin A. Leon
*Assistant Examiner* — Iman Malakooti
(74) *Attorney, Agent, or Firm* — Eckert Seamans Cherin & Mellott, LLC; John P. Powers; Philip E. Levy

(57) ABSTRACT

A component is for an electric power system. The component includes: a user access panel; a first element for directing visible light; a second element for directing visible light, the second end of the first element facing the second end of the second element; a movable conductor structured to move between a first position and a second position; and a stationary conductor structured to engage the movable conductor. In the first position the movable conductor is disposed between the second end of the first element and the second end of the second element, thereby blocking visible light from passing from the first element to the second element. In the second position the movable conductor is not disposed between the second end of the first element and the second end of the second element, thereby permitting visible light to pass from the first element to the second element.

19 Claims, 8 Drawing Sheets

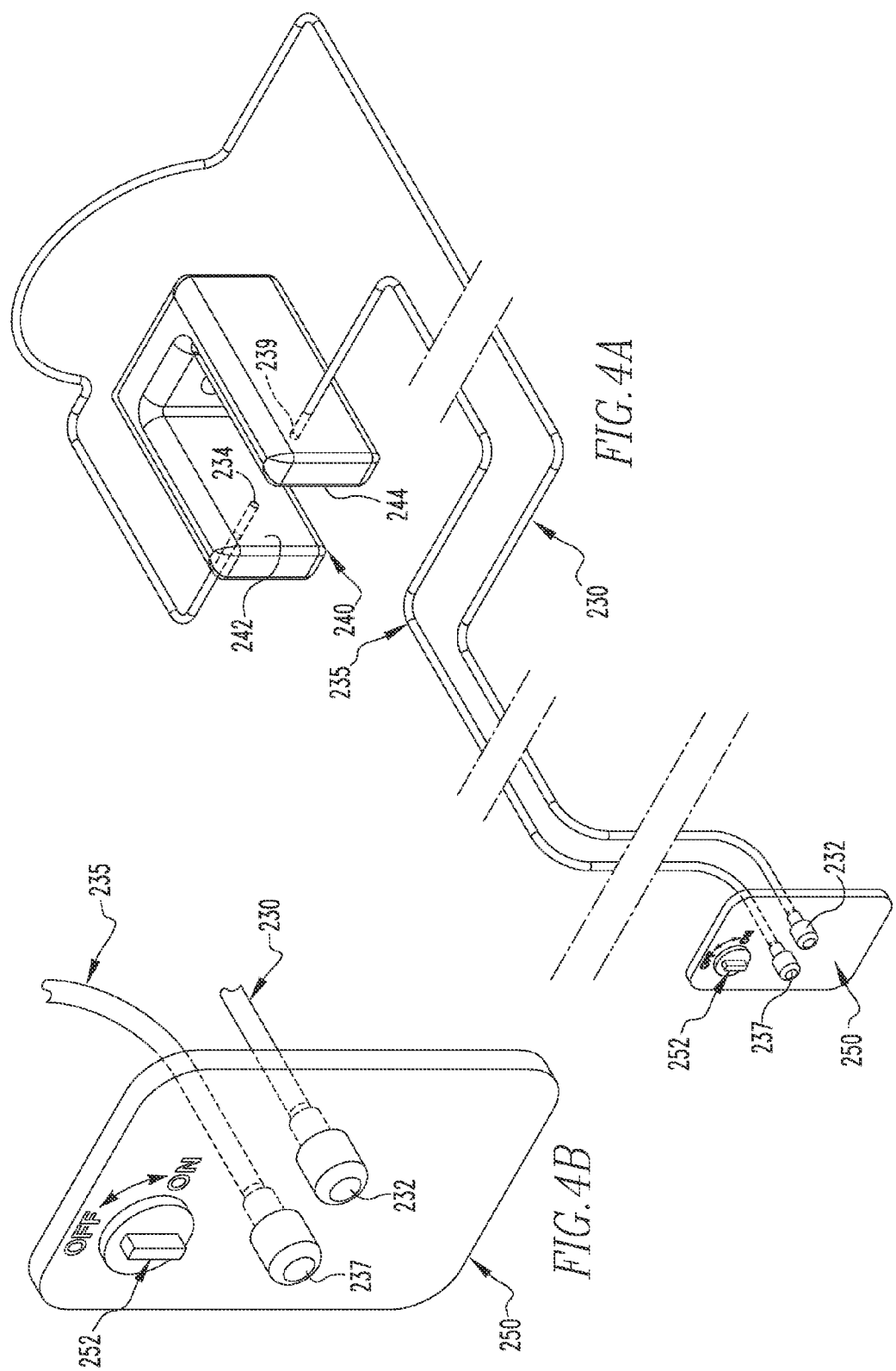

COMPONENT FOR ELECTRIC POWER SYSTEM AND METHOD OF DETERMINING WHETHER A POWER CIRCUIT IN AN ELECTRIC POWER SYSTEM IS OPEN OR CLOSED

BACKGROUND

1. Field

The disclosed concept pertains generally to components for electric power systems. The disclosed concept also pertains to methods of determining whether a power circuit in an electric power system is open or closed.

2. Background Information

Electric power systems incorporate switches for control and protection purposes. Distribution systems, which form part of an overall electric power system, include main and branch power buses and circuit breakers mounted in metal cabinets to form switchgear. Interruption of current flow in the buses of the distribution system by a circuit breaker creates an arc as the contacts of the circuit breaker open. These arcs caused by interruption are contained and extinguished in the normal course of operation of the circuit breaker.

At times, however, unintended arcing faults can occur within switchgear cabinets, such as between power buses, or between a power bus and a grounded metal component. Such arcing faults can produce high energy gases, which pose a threat to the structure and nearby personnel. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

There are disconnect switches intended to isolate portions of an electric power system for maintenance that do not allow for indication of open or closed power circuit status by a user in locations readily visible to a user. Because of this, accessing energized electrical equipment is more dangerous.

There is room for improvement in components for electric power systems.

There is also room for improvement in methods of determining whether a power circuit in an electric power system is open or closed in cases where the switch contacts are not directly visible by a user.

SUMMARY

These needs and others are met by embodiments of the disclosed concept in which visible light is directed through elements to determine the position of a movable conductor.

In accordance with one aspect of the disclosed concept, a component for an electric power system is provided. The component comprises: a user access panel; a first element for directing visible light, the first element having a first end and a second end, the first end of the first element terminating at or proximate the user access panel; a second element for directing visible light, the second element having a first end and a second end, the first end of the second element terminating at or proximate the user access panel, the second end of the first element facing the second end of the second element; a movable conductor structured to move between a first position and a second position; and a stationary conductor structured to engage the movable conductor. In the first position the movable conductor is disposed between the second end of the first element and the second end of the second element, thereby blocking visible light from passing from the first element to the second element. In the second position the movable conductor is not disposed between the second end of the first element and the second end of the second element, thereby permitting visible light to pass from the first element to the second element.

As another aspect of the disclosed concept, a component for an electric power system is provided. The component comprises: a user access panel comprising a user input member; a first element for directing visible light, the first element having a first end and a second end, the first end of the first element terminating at or proximate the user access panel; a second element for directing visible light, the second element having a first end and a second end, the first end of the second element terminating at or proximate the user access panel, the second end of the first element facing the second end of the second element; a light source disposed at or proximate the user access panel, the light source being structured to be energized in response to activation of the user input member and pass visible light to the first end of the first element; a movable conductor structured to move between a first position and a second position; and a stationary conductor structured to engage the movable conductor. In the first position the movable conductor is disposed between the second end of the first element and the second end of the second element, thereby blocking visible light from passing from the first element to the second element. In the second position the movable conductor is not disposed between the second end of the first element and the second end of the second element, thereby permitting visible light to pass from the first element to the second element.

As another aspect of the disclosed concept, a method of determining whether a power circuit in an electric power system is open or closed is provided. The electric power system comprises a component; the component comprises a user access panel, a stationary conductor, and a movable conductor structured to engage the stationary conductor; the power circuit is closed when the movable conductor engages the stationary conductor; the power circuit is open when the movable conductor does not engage the stationary conductor; and the movable conductor is structured to move between a first position and a second position. The method comprises: providing a first element for directing visible light, the first element having a first end and a second end; terminating the first end of the first element at or proximate the user access panel; providing a second element for directing visible light, the second element having a first end and a second end; terminating the first end of the second element at or proximate the user access panel; providing the second end of the first element facing the second end of the second element; disposing the movable conductor between the second end of the first element and the second end of the second element in the first position but not the second position; passing visible light into the first end of the first element; and either exiting the visible light from the first end of the second element when the movable conductor is in the second position, or blocking the visible light from entering the second end of the second element when the movable conductor is in the first position.

BRIEF DESCRIPTION OF THE DRAWINGS

A full understanding of the disclosed concept can be gained from the following description of the preferred embodiments when read in conjunction with the accompanying drawings in which:

FIG. 4A is an isometric view of a portion of the load break switch of FIG. 3.

FIG. 4B is an isometric view of a portion of FIG. 4A.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1:
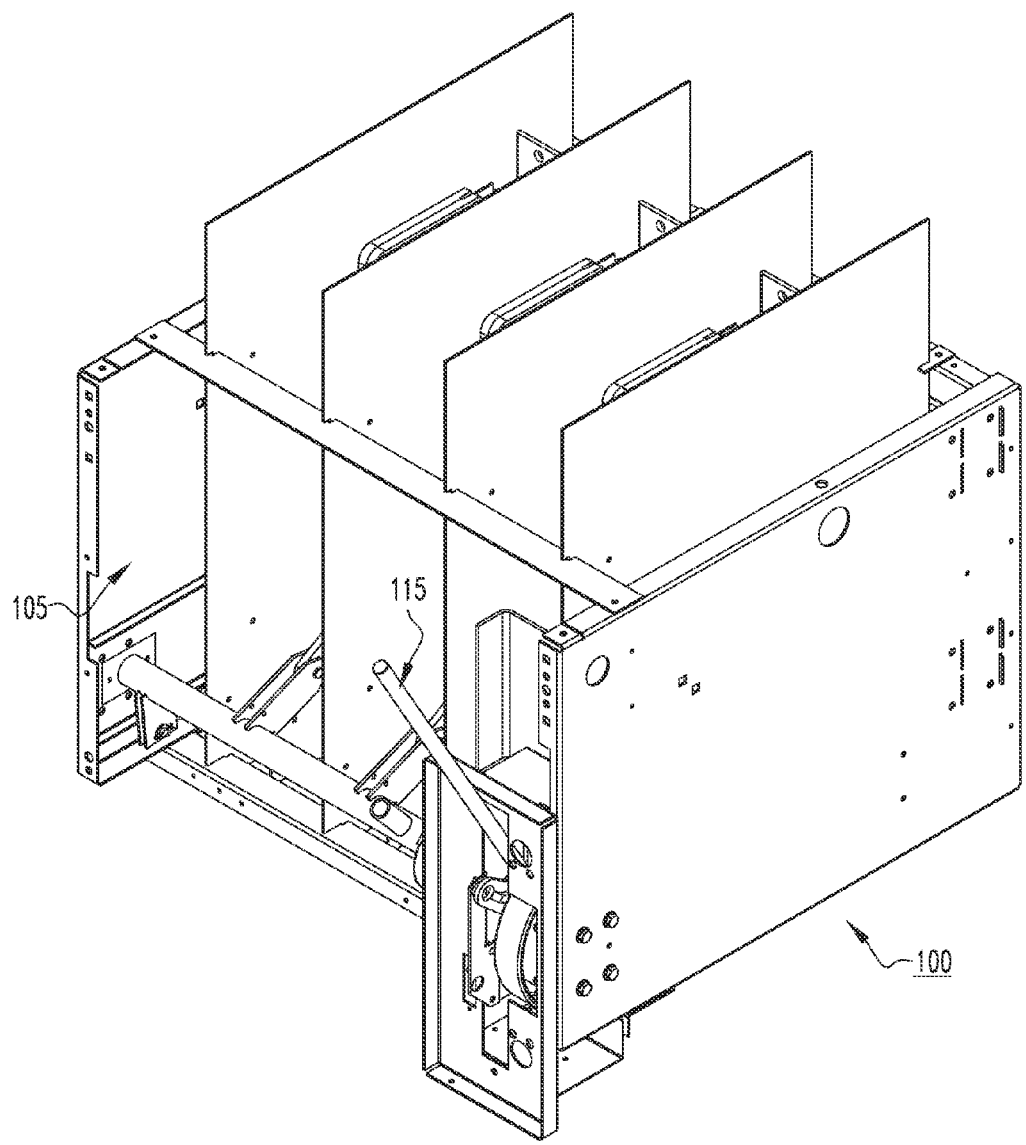
FIG. 1 is a front isometric view of a load break switch.
Figure 2:
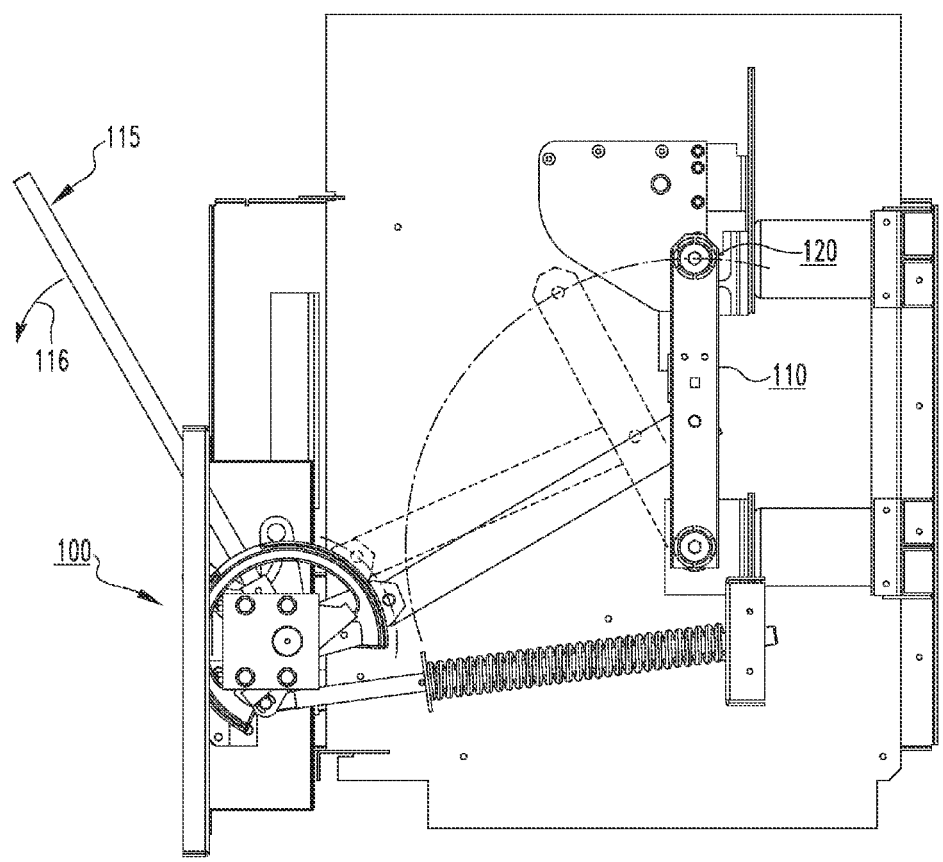
FIG. 2 is a side view, partially cut away, of the load break switch of FIG. 1.
Figure 3:
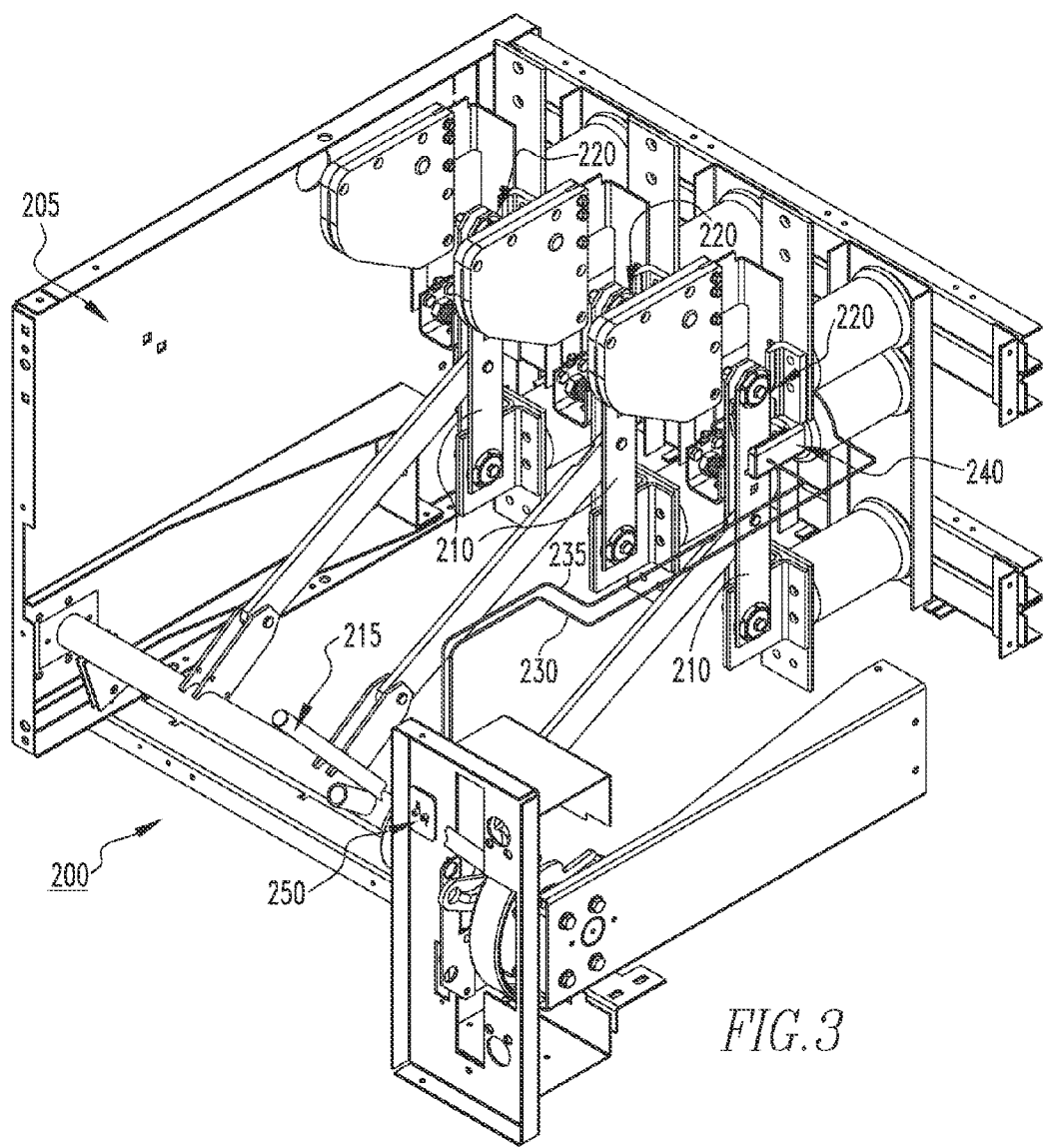
FIG. 3 is a front isometric view, partially cut away, of a load break switch in accordance with an embodiment of the disclosed concept.

FIGS. 1 and 2 show a load break switch 100. As seen in FIG. 2, the load break switch 100 includes a movable conductor 110 that engages a stationary conductor 120 in a first position and does not engage the stationary conductor 120 in a second position (shown in phantom line drawing). The load break switch 100 also includes a lever 115 that is structured to move in a direction 116 upon activation by a user.

The load break switch 100 is part of an electric power system (not shown) that has a power circuit. When the movable conductor 110 engages the stationary conductor 120, the power circuit is closed and current can flow. When the movable conductor 110 does not engage the stationary conductor 120, the power circuit is open and current cannot flow. The load break switch 100 further includes a housing (see, for example, housing 105, partially shown in FIG. 1) which prevents a user from determining whether the movable conductor 110 is engaging the stationary conductor 120 or not (i.e., whether the power circuit is open or closed).

As will be discussed in connection with FIGS. 3, 4A, 4B, 5A, 5B, 6 and 7, a load break switch 200 allows for visible indication of power circuit status within an electric power system (not shown). Except as will be described, the load break switch 200 can be similar to the load break switch 100 of FIGS. 1 and 2. The load break switch 200 includes a number of movable conductors 210 that are structured to engage a number of stationary conductors 220 in a first position, as shown. In an electric power system including the load break switch 200, when the movable conductors 210 are in the first position, a corresponding number of power circuits are closed.

Figure 7:
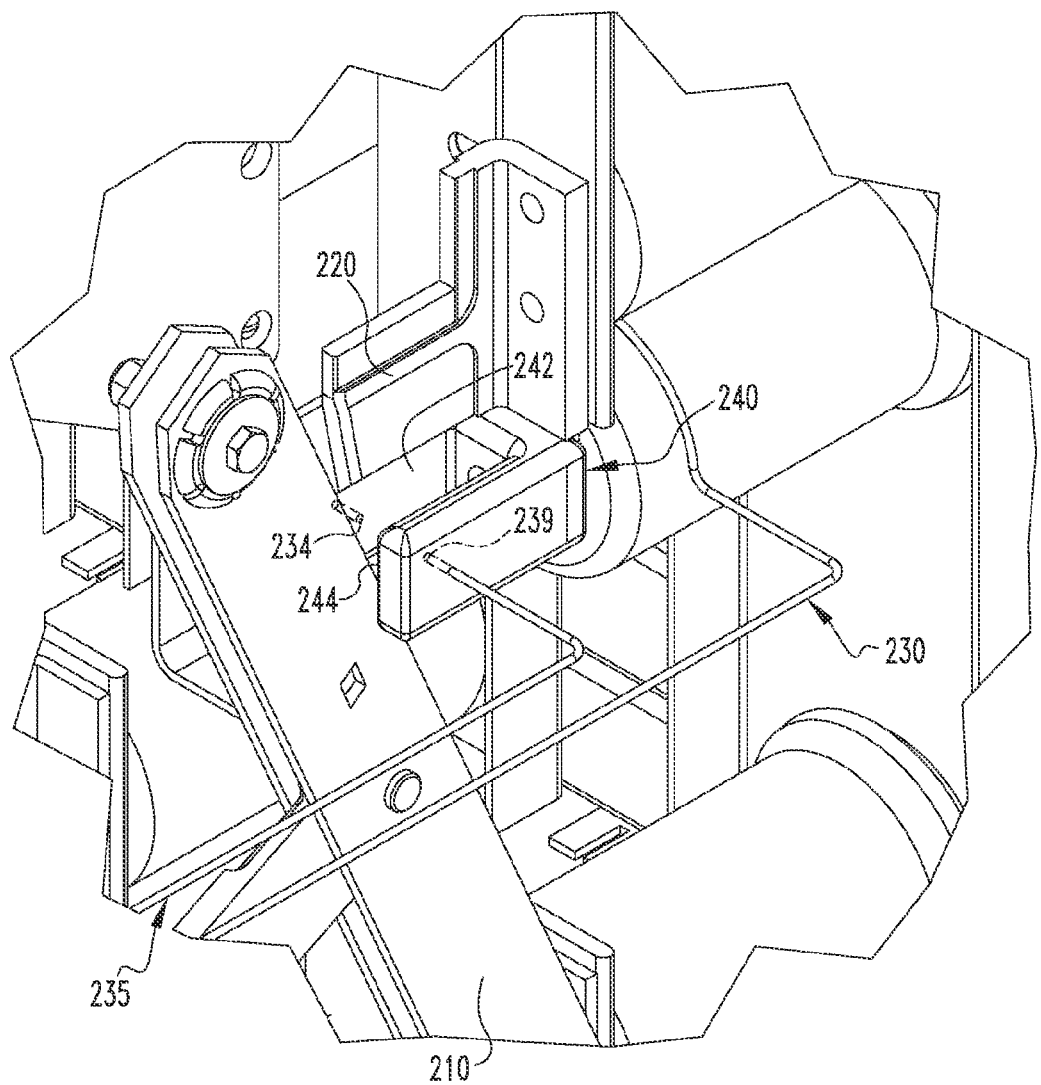
FIG. 7 is an isometric view of a portion of the load break switch of FIG. 3 in an open position.

The load break switch 200 further includes a lever 215 and upon activation of the lever 215 by a user, the movable conductors 210 move from the first position to a second position (see, for example, FIG. 7). In the second position, the movable conductor 210 does not engage the stationary conductor 220 and the corresponding power circuit is open. Partially shown in FIG. 3, the load break switch 200 includes a housing 205 which interferes with the ability to visibly determine power circuit status within the load break switch 200. However, unlike the load break switch 100 of FIGS. 1 and 2, visible indication of power circuit status within the load break switch 200 can be determined by employing one of a number of light sources 260 (FIG. 5A), 270 (FIG. 5B) with a user access panel 250 (FIG. 3), a number of elements 230,235 (FIG. 3), and a member 240 (FIG. 3) internal to the housing 205.

FIG. 4A shows the user access panel 250, the elements 230,235 and the member 240. As seen, the first element 230 includes a first end 232 and a second end 234. Similarly, the second element 235 includes a first end 237 and a second end 239. The first ends 232,237 terminate at or proximate the user access panel 250. The member 240 includes a first surface 242 and a second surface 244 opposite the first surface 242. As seen, the second end 234 of the first element 230 terminates at or proximate the first surface 242 of the member 240. The second end 239 of the second element 235 terminates at or proximate the second surface 244 of the member 240 and faces the second end 234 of the first element 230. Optionally, in one embodiment, as seen in FIGS. 4A and 4B, the user access panel 250 includes a user input member 252.

In the example embodiment, the elements 230,235 are fiber optic cables that direct visible light. Schematically shown in FIG. 5A, a light source 260 is structured to be located at or proximate the first end 232 of the first element 230 at the user access panel 250. The light source 260 includes a voltage source 262, a resistor 264, a diode 266, and a switch 268 electrically connected in series to a ground 269. Upon activation of the user input member 252, the light source 260 is structured to be energized by the switch 268 and pass visible light into the first end 232 of the first element 230.

Figure 5A:
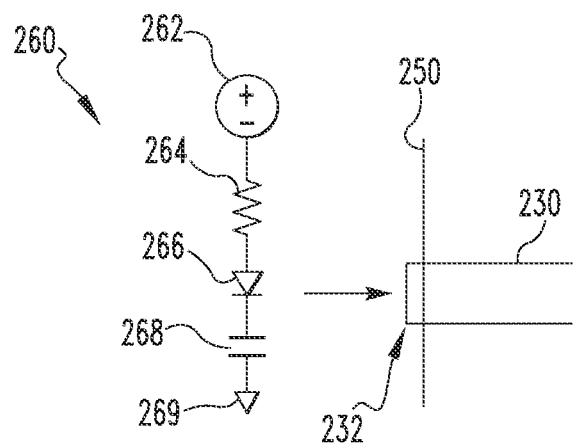
FIG. 5A is a schematic view of a light source in accordance with an embodiment of the disclosed concept.
Figure 5B:
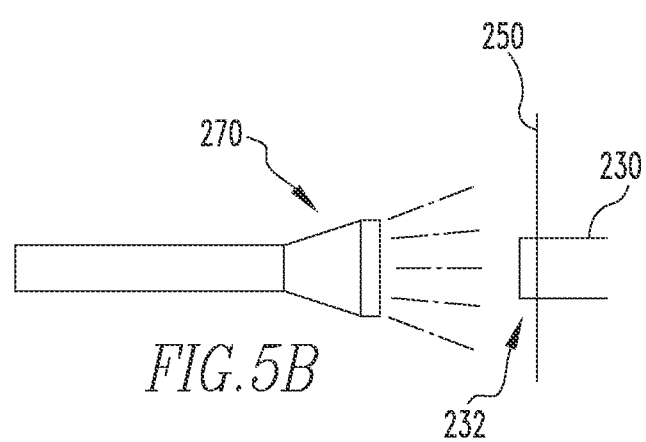
FIG. 5B is a schematic view of another light source in accordance with another embodiment of the disclosed concept.

Schematically shown in FIG. 5B is another example light source 270 that is a flashlight. In accordance with an alternative embodiment of the disclosed concept, a user shines the light source 270 into the first end 232 of the first element 230. Referring to FIGS. 4A, 4B, 5A, and 5B, when either of the light sources 260,270 pass visible light into the first element 230 and nothing is disposed between the first surface 242 and the second surface 244 of the member 240, the visible light exits the first end 237 of the second element 235. Hence, by viewing the visible light exiting from the first end 237, the user knows in this example, that the corresponding power circuit is open (and is not energized).

Figure 6:
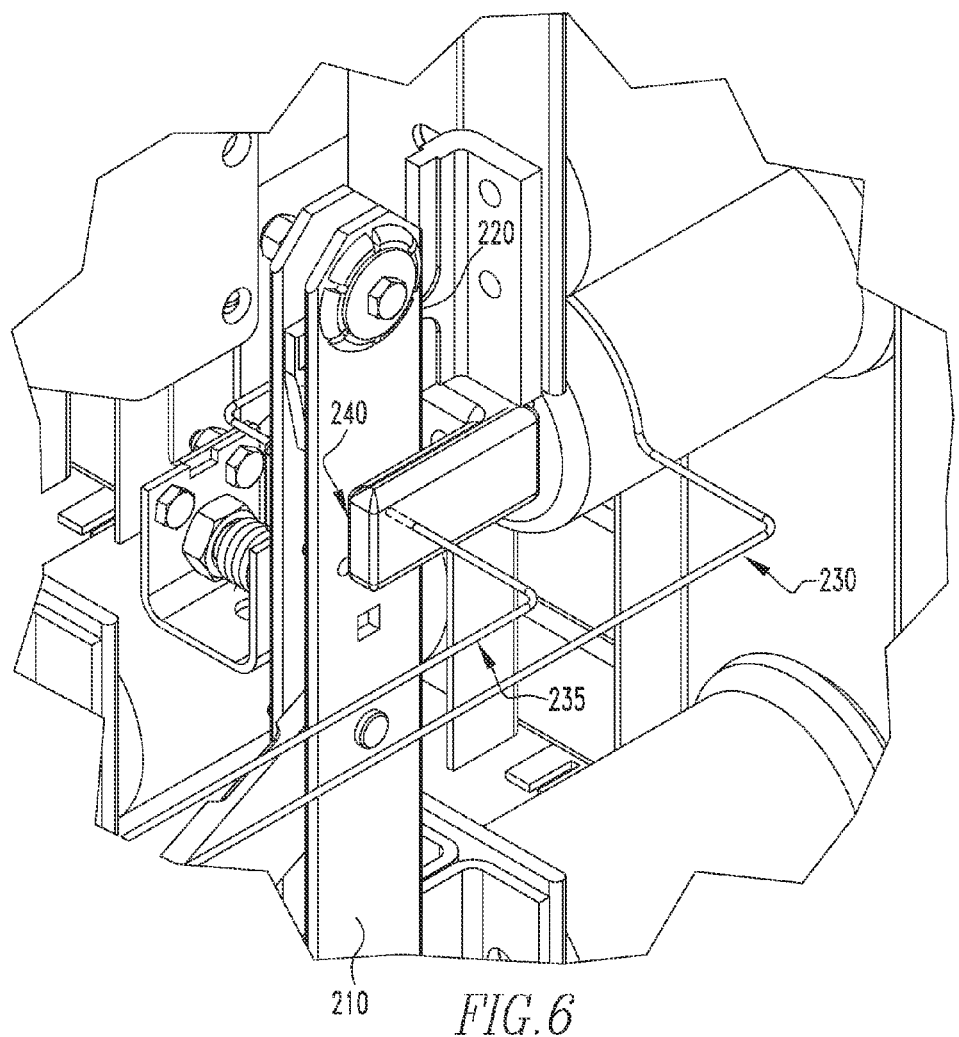
FIG. 6 is an isometric view of a portion of the load break switch of FIG. 3 in a closed position.

As seen in FIG. 6, the movable conductor 210 engages the stationary conductor 220 in the first position. In this manner, the power circuit within the electric power system (not shown) is closed. In accordance with the disclosed concept, when a user activates the user input member 252 or shines the light source 270 into the first end 232 of the first element 230, visible light is passed into the first element 230. Continuing to refer to FIG. 6, the movable conductor 210 is located between the second end (see, for example, second end 234 in FIG. 4A) of the first element 230 and the second end (see, for example, second end 239 in FIG. 4A) of the second element 235 in the first position.

Thus, in the first position (e.g., as shown in FIG. 6), the movable conductor 210 blocks visible light from passing from the first element 230 to the second element 235. In operation, when a user activates the user input member 252 or shines the light source 270 into the first end 232 of the first element 230 and does not see visible light exit the first end 237 of the second element 235, the user will be able to determine that the movable conductor 210 is in the first position. In other words, the user will know by not seeing the visible light at the first end 237 of the second element 235 that the movable conductor 210 is engaging the stationary conductor 220, that the corresponding power circuit is closed (and energized), and that it is not safe to access the power circuit controlled by the load break switch 200.

FIG. 7 shows the movable conductor 210 in the second position, not located between the ends 234,239 of FIG. 4A. In this manner, when a user activates the user input member 252 or shines the light source 270 into the first end 232 of the first element 230, visible light is permitted to pass from the first element 230 to the second element 235. Thus, in the second position, the visible light is permitted to exit the first end 237 of the second element 235 and indicate to a user that the movable conductor 210 is in the second position. In other words, the user will know by seeing the visible light at the first end 237 of the second element 235 that the movable conductor 210 is not engaging the stationary conductor 220, that the power circuit is open (and not energized), and that it is safe to access the power circuit controlled by the load break switch 200.

Figure 8:
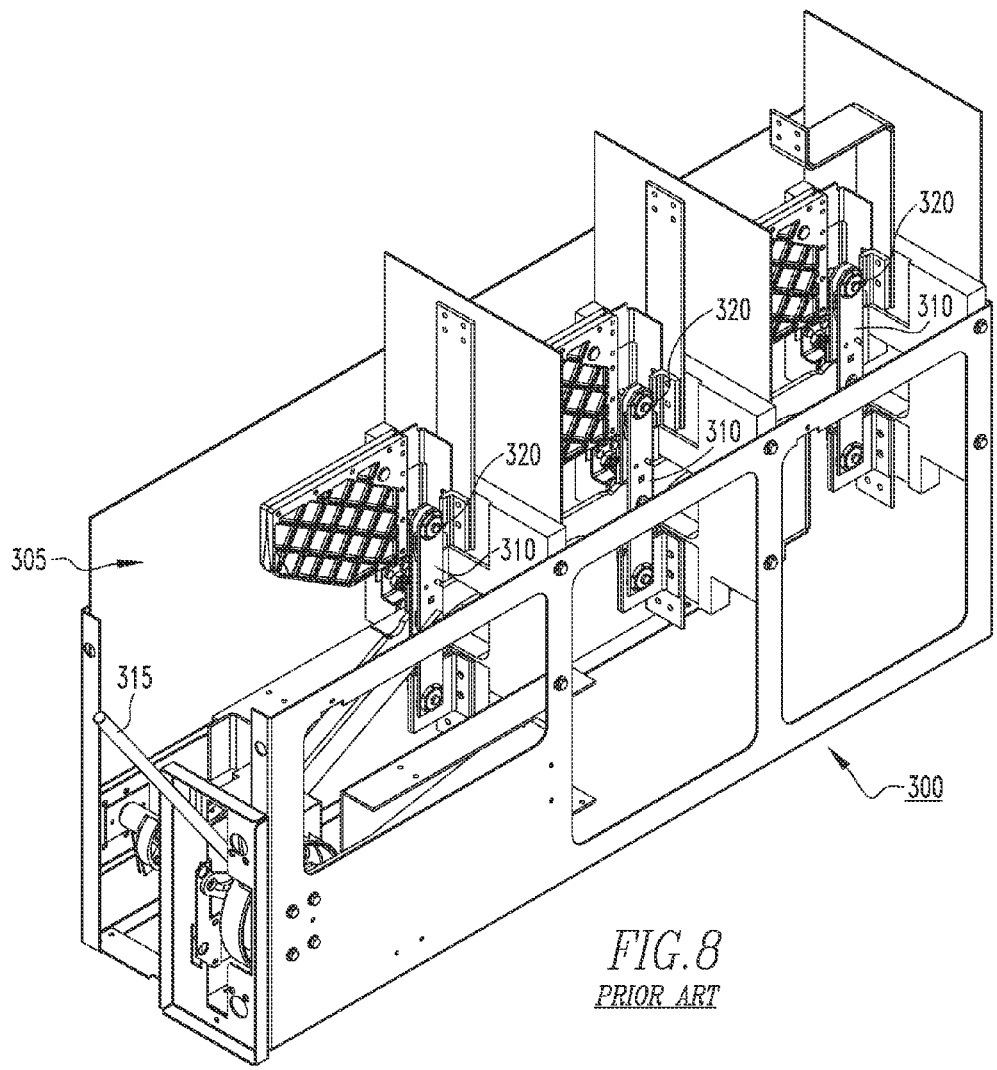
FIG. 8 is a front isometric view of a load break switch.

The disclosed concept has been described in association with the example load break switch 200. However, other load break switches (see, for example, load break switch 300, shown in FIG. 8) can be suitably modified within the scope of the disclosed concept. As seen in FIG. 8, the load break switch 300 differs from the load break switch 100 in size and shape, but is similar in that it includes a number of movable conductors 310 that engage a number of stationary conductors 320 in a first position. Upon activation of a lever 315 by a user, the movable conductors 310 are structured to move to a second position (not shown) and not engage the stationary conductors 320. The load break switch 300 also includes a housing (see, for example, housing 305, partially shown in FIG. 8), that prevents visible indication of power circuit status within the load break switch 300.

Although not shown in FIG. 8, it is within the scope of the disclosed concept for the load break switch 300 to be modified to employ one of a number of light sources with a user access panel, elements, and a member for indication of power circuit status within an electric power system (not shown) substantially similar to the light sources 260,270, user access panel 250, elements 230,235, and member 240 of the load break switch 200. Accordingly, it will be appreciated that visible indication of power circuit status within the load break switch 300 can be determined in the same manner as discussed above in association with the load break switch 200.

For example and without limitation, light sources, user access panels, elements, and members substantially similar to those set forth above may be employed with other components, including other circuit interrupters and electrical switching apparatus. Additionally, although the disclosed concept has been described in association with the member 240 being mounted within the load break switch 200 in the location shown in FIGS. 3, 6, and 7, it is within the scope of the disclosed concept for the member 240 to be mounted in other locations.

For example and without limitation, it is within the scope of the disclosed concept for the movable conductor 210 to be in the second position (FIG. 7) and be located between opposite surfaces of a member (not shown) such that in the second position, the movable conductor 210 blocks visible light from passing from a first element (not shown) to a second element (not shown) and in the first position the movable conductor 210 does not block visible light from passing from the first element to the second element. Additionally, it is within the scope of the disclosed concept to have the second ends 234,239 face each other and not have the example member 240 mounted within the load break switch 200.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A component for an electric power system, the component comprising:
   a user access panel;
   a first element for directing visible light, the first element having a first end and a second end, the first end of the first element terminating at or proximate the user access panel;
   a second element for directing visible light, the second element having a first end and a second end, the first end of the second element terminating at or proximate the user access panel, the second end of the first element facing the second end of the second element;
   a movable conductor structured to move between a first position and a second position; and
   a stationary conductor structured to engage the movable conductor;
   wherein in the first position the movable conductor is disposed between the second end of the first element and the second end of the second element, thereby blocking visible light from passing from the first element to the second element; and
   wherein in the second position the movable conductor is not disposed between the second end of the first element and the second end of the second element, thereby permitting visible light to pass from the first element to the second element.

2. The component of claim 1, wherein the component further comprises a housing and a member internal to the housing; wherein the member has a first surface and a second surface opposite the first surface; wherein the second end of the first element terminates at or proximate the first surface; and wherein the second end of the second element terminates at or proximate the second surface.

3. The component of claim 1, wherein the component is a load break switch.

4. The component of claim 1, wherein the component is a circuit interrupter.

5. The component of claim 1, wherein the component is an electrical switching apparatus.

6. The component of claim 1, wherein each of the first element and the second element is a fiber optic cable.

7. The component of claim 1, wherein the electric power system has a power circuit; and wherein the power circuit is closed when the movable conductor is in the first position and engages the stationary conductor.

8. A component for an electric power system, the component comprising:
   a user access panel comprising a user input member;

a first element for directing visible light, the first element having a first end and a second end, the first end of the first element terminating at or proximate the user access panel;

a second element for directing visible light, the second element having a first end and a second end, the first end of the second element terminating at or proximate the user access panel, the second end of the first element facing the second end of the second element;

a light source disposed at or proximate the user access panel, the light source being structured to be energized in response to activation of the user input member and pass visible light to the first end of the first element;

a movable conductor structured to move between a first position and a second position; and a stationary conductor structured to engage the movable conductor;

wherein in the first position the movable conductor is disposed between the second end of the first element and the second end of the second element, thereby blocking visible light from passing from the first element to the second element; and wherein in the second position the movable conductor is not disposed between the second end of the first element and the second end of the second element, thereby permitting visible light to pass from the first element to the second element.

9. The component of claim 8, wherein each of the first element and the second element is a fiber optic cable.

10. The component of claim 8, wherein the component is a load break switch.

11. A method of determining whether a power circuit in an electric power system is open or closed; the electric power system comprises a component; the component comprises a user access panel, a stationary conductor, and a movable conductor structured to engage the stationary conductor; the power circuit is closed when the movable conductor engages the stationary conductor; the power circuit is open when the movable conductor does not engage the stationary conductor; and the movable conductor is structured to move between a first position and a second position, said method comprising:

providing a first element for directing visible light, the first element having a first end and a second end;

terminating the first end of the first element at or proximate the user access panel;

providing a second element for directing visible light, the second element having a first end and a second end;

terminating the first end of the second element at or proximate the user access panel;

providing the second end of the first element facing the second end of the second element;

disposing the movable conductor between the second end of the first element and the second end of the second element in the first position but not the second position;

passing visible light into the first end of the first element; and either exiting the visible light from the first end of the second element when the movable conductor is in the second position, or blocking the visible light from entering the second end of the second element when the movable conductor is in the first position.

12. The method of claim 11 further comprising:

providing a housing on the component;

providing a member internal to the housing, the member having a first surface and a second surface opposite the first surface;

terminating the second end of the first element at or proximate the first surface; and terminating the second end of the second element at or proximate the second surface.

13. The method of claim 11 further comprising employing as the component a load break switch.

14. The method of claim 11 further comprising employing as the component a circuit interrupter.

15. The method of claim 11 further comprising employing as the component an electrical switching apparatus.

16. The method of claim 11 further comprising employing as each of the first element and the second element a fiber optic cable.

17. The method of claim 11 further comprising closing the power circuit when the movable conductor is in the first position.

18. The method of claim 11 further comprising opening the power circuit when the movable conductor is in the second position.

19. The method of claim 11 further comprising providing a light source at or proximate the first end of the first element at the user access panel; and energizing the light source to pass the visible light through the first element.

* * * * *